United States Patent [19]

Bower

[11] 4,303,395

[45] Dec. 1, 1981

[54] EMERGENCY AUDIBLE INSTRUCTION APPARATUS FOR A FIRE EXTINGUISHER

[76] Inventor: James C. Bower, Box 244 E. Rte. 9, Fort Worth, Tex. 76101

[21] Appl. No.: 47,037

[22] Filed: Jun. 11, 1979

[51] Int. Cl.[3] .............................................. G11B 31/00

[52] U.S. Cl. ...................................... 434/226; 369/20; 369/69; 340/568; 169/61

[58] Field of Search .................... 360/12; 179/100.1 C, 179/100.1 PS, 100.1 R; 35/8 A; 169/51, 61; 340/568, 692; 369/19, 20, 69; 434/226

[56] References Cited

U.S. PATENT DOCUMENTS

| | | | |
|---|---|---|---|
| 2,683,260 | 7/1954 | Lavelle | 340/568 |
| 3,145,375 | 8/1964 | Webb | 340/568 |
| 3,582,949 | 6/1971 | Forst | 360/12 |
| 3,668,648 | 6/1972 | Yoshikawa | 360/12 |
| 3,794,765 | 2/1974 | Goodwater | 179/100.1 PS |
| 3,798,672 | 3/1974 | Gregg | 360/12 |
| 3,804,993 | 4/1974 | Honnold | 360/12 |
| 3,858,195 | 12/1974 | Gregg | 360/12 |
| 3,909,842 | 9/1975 | Noji | 360/12 |
| 4,100,581 | 7/1978 | Slack | 179/100.1 C |
| 4,117,461 | 9/1978 | Kiebala | 179/100.1 C |

*Primary Examiner*—Alan Faber
*Attorney, Agent, or Firm*—Wofford, Fails & Zobal

[57] ABSTRACT

A improvement in a combination for responding to an emergency, characterized by audible instruction means for instructing a participant in handling the emergency and an activator for activating the instruction means to give particular audible instructions to the participant handling the particular emergency so that the participant can use both hands and eyes in treating the emergency rather than having to read instructions or the like. In specific aspects, multiple instructions may be included with a selector for selecting a particular emergency; or a particular type of emergency such as instruction and precautions for a particular type of fire extinguisher may be implaced at a particular location for a particular type fire extinguisher or the like.

4 Claims, 6 Drawing Figures

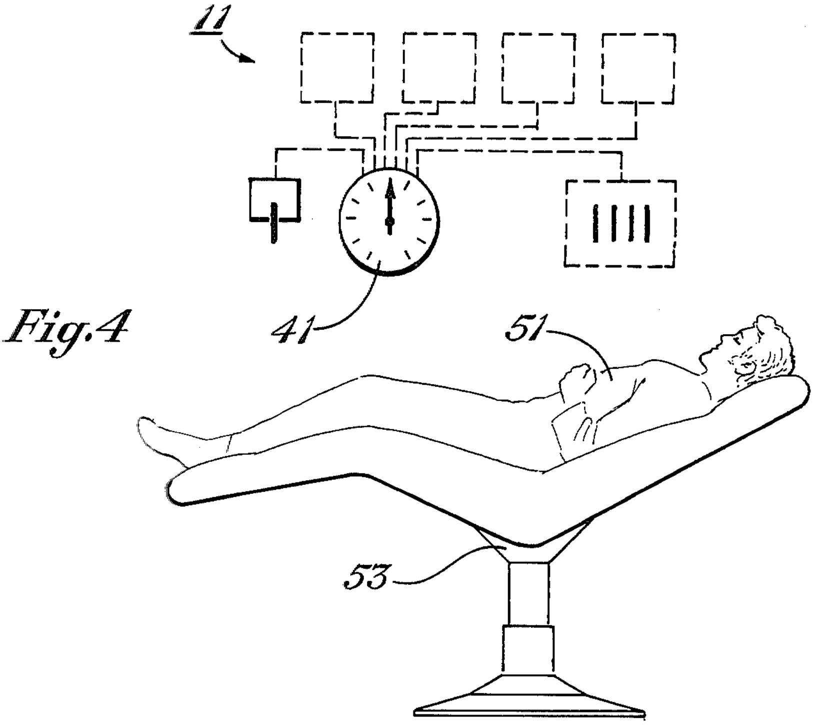
Fig. 4
Fig. 5
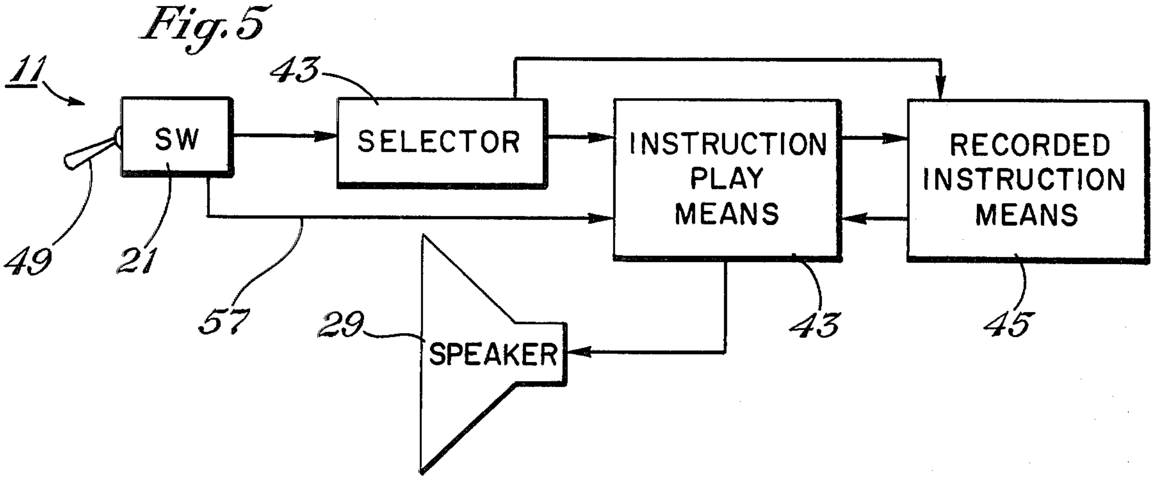
Fig. 6
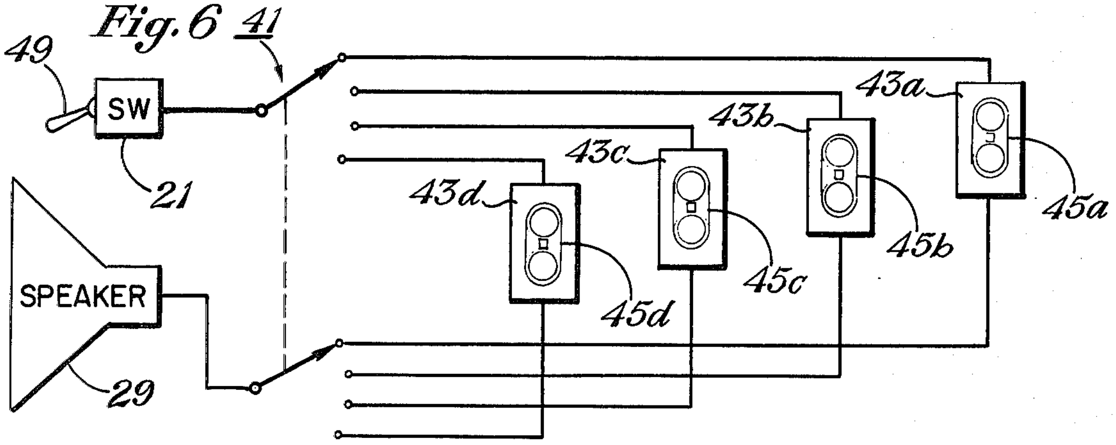

EMERGENCY AUDIBLE INSTRUCTION APPARATUS FOR A FIRE EXTINGUISHER

BACKGROUND OF THE INVENTION

1. Field of the Invention

This invention relates to an improvement in apparatus facilitating responding to an emergency. In particular aspects, this invention pertains to an improvement in a combination in which either; (1) a single emergency instruction is stored at a predetermined location; for example, instructions on how and where to use a given fire extinguisher; or (2) a plurality of predetermined emergency instructions are stored with a selector for selecting a particular instructions for a particular one of the predetermined types of emergency.

2. Description of the Prior Art

The prior art has seen varied approaches to the handling of emergency instructions or to the use of audible instructions. The prior art systems have included use of instruction booklets having indices in which the particular emergency has to be located; then pages flipped to locate the emergency; and read step by step while trying to perform the emergency with one hand and constantly going back to reread the instructions. The prior art also has included sophisticated computer instructions that are activated by a particular code on a telephone to give a caller instructions as to how to fill out a bank deposit, how to call a particular bit of information regarding insurance policies or the like.

In so far as I am aware, however, the prior art has not provided economical readily available instructions in audible form to enable the participant in the emergency to use both hands and eyes to carry out the instructions given audibly in resolving the emergency.

SUMMARY OF THE INVENTION

Accordingly, it is an object of this invention to provide an improvement in a combination apparatus in which economical apparatus is employed that can be triggered to give audible instructions to the participant in the emergency and allow the participant to use both hands and eyes in carrying out the instructions at the site where the instructions are given.

It is a specific object of this invention to have particular set of instructions recorded on a single recording means at a predetermined location, or site, to be coordinated with the type of emergency likely to occur at the site; for example, the use of a particular type of fire extinguisher.

It is a further object of this invention to provide a plurality of selectable instructions and a selector for selecting among those instructions for a given emergency with an activation means for activating the instructions to give audibly the instructions to the participant in the particular selected emergency.

These and other objects will become apparent from the descriptive matter hereinafter; particularly, when taken in conjunction with the appended drawings.

In accordance with this invention there is provided an improvement in a combination apparatus in which an emergency is to be responded to, comprising:

a. a selector for selecting a particular nature of an emergency from among a predetermined and a preselected plurality of emergencies;

b. multiple audible instruction means for instructing a participant for handling a predetermined and preselected emergency; the audible instruction means being responsively connected with the selector for selecting only a single instruction means to be played at a time; and c. activator means for activating a selected instruction means to give audible instructions to the participant so as to allow the participant to use both hands and eyes in treating the emergency; the activator means being connected with the instruction means so as to afford a playout of the selected instruction.

In a particular aspect, this invention includes a combination comprising:

a. a fire extinguisher of a particular type disposed at a particular location;

b. a support supporting the fire extinguisher such that the fire extinguisher can be readily removed from the support;

c. an audible instruction means for giving instructions audibly and an activation means for activating the instruction means; the activation means being responsively connected with the fire extinguisher on the support so as to energize the audible instruction means when the fire extinguisher is removed from the support and prepared to be used; the audible instruction means containing audible instructions as to how to properly prepare and how to properly use the fire extinguisher, including the precautions the types of fires on which it is to be used and on which it is not to be used.

BRIEF DESCRIPTION OF THE DRAWINGS

FIG. 4 is a partial side elevational view illustrating another embodiment of this invention in which a plurality of instructions are selected by a selector for giving a particular one of the plurality of instructions to the participant.

FIG. 5 is a block diagram of the apparatus of FIG. 4.

FIG. 6 is a schematic illustration of one embodiment of FIG. 5.

DESCRIPTION OF THE PREFERRED EMBODIMENT

This invention is susceptible of many uses, or applications. It was originally conceived and developed for the purpose of solving problems plaguing employers, manufacturers of fire extinguishers, and the like.

One of the problems that has plagued industry has been proper use of safety equipment, such as fire extinguishers. Specifically, fire extinguishers that are designed to put out paper fires and the like are frequently dangerous when employed around electrical fires. Moreover, certain fire extinguishers contain high pressure fluid that are dangerous, because of the cold, invasion of the lungs, or other hazards. Accordingly, one straight forward aspect of this invention will be described in connection with the problem of proper use of a fire extinguisher.

Figure 1:
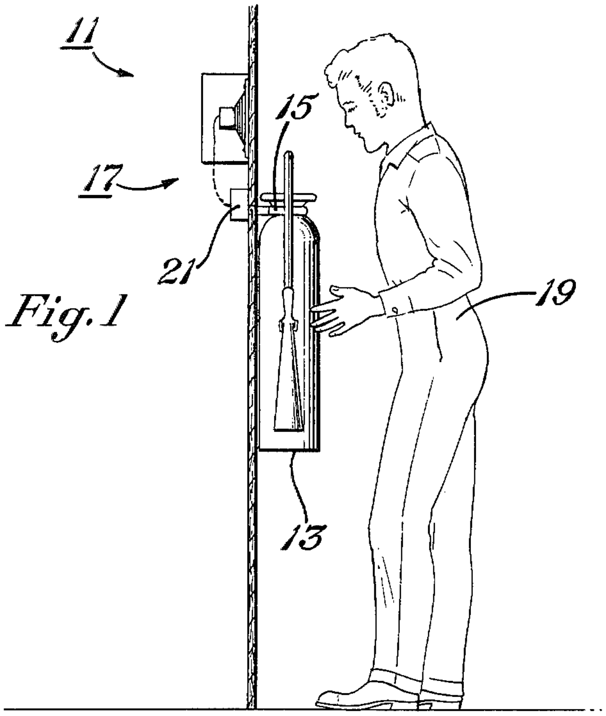
FIG. 1 is a partial elevational view, partly in section, showing a fire extinguisher and combination for giving audible instructions when the fire extinguisher is removed in accordance with one embodiment of this invention.

Referring to FIG. 1, the combination, or apparatus, 11 includes a fire extinguisher 13, a support 15 and an audible instruction means and activation means 17 for giving instructions audibly when the fire extinguisher is lifted by the person 19 from the support 15.

The fire extinguisher 13 may comprise any of the conventional fire extinguishers on the market today depending upon the location in which it is supported. For example, if there is the danger of electrical fires, fire extinguisher 13 may comprise a carbon dioxide fire extinguisher or a pressurized fire extinguisher that emits a powder such as a bicarbonate to smother the fire. Frequently these type fire extinguishers have a pin which must be pulled before the handle can be actuated to release the chemicals to extinguish the fire. Such pins are usually held in place by seals that must be removed before the pins can be pulled. After a pin is pulled from a fire extinguisher, the hose and nozzle will be directed at the appropriate portion of the fire; for example, at the base of the fire; for the desired result. Once used the fire extinguisher 13 should be readied for subsequent use, as by recharging or the like, before being returned to the support 15.

The support 15 may comprise any of the usual supports for fire extinguishers. For example, fire extinguishers have been employed where a small bracket was adhered to the side of the fire extinguisher near the top and hung on the suitable bracket on the wall. In other fire extinguishers, the support 15, comprised a bifurcated yoke that engaged beneath the main valve at the top of the fire extinguisher. Any of the conventional type supports can be employed as long as they are modified to the effect turning on of a switch 21, FIG. 2. As illustrated, the support 15 comprises a yoke for supporting the top of fire extinguisher 13. The support 15 is pivotally mounted so as to effect turning on or off the switch for the audible instruction means and activation means 17.

Figure 2:
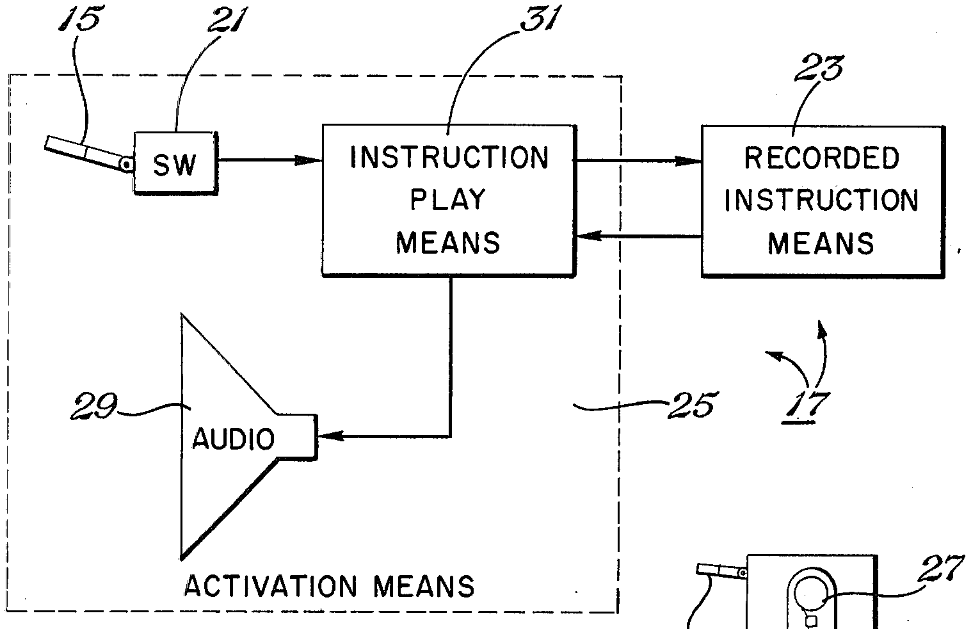
FIG. 2 is a schematic illustration of the embodiment of FIG. 1.

As can be seen in FIG. 2, the audible instruction means and activation means 17 comprises a recorded instruction means 23 and an activation means 25 for activating the instruction means.

The recorded instruction means 23 is for the purpose of affording instructions to the person 19. Any of the conventional recorded instruction means can be employed herein. As illustrated, the recorded instruction means comprises instructions recorded on a cassette 27, FIG. 3. As is recognized, these sets are small dual spool tape holders where the tape can be recorded by being moved past a record head on a given spool and thereafter rewound such that when moved past the read head, the instructions will be played out. Many economical cassette recorders are available on the market and need not be described herein.

The activation means 25 comprises a speaker 29 for converting the electronic signal into a sound that is audible to the human ear for instructing the person 19; an instruction play means 31 for playing the recorded instruction means 23 and emitting the electronic signals to the speaker 29; and a switch 21 for turning on the instruction play means 31.

Figure 3:
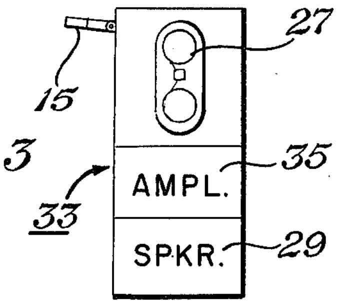
FIG. 3 is a front view of a typical small unit facilitating carrying out the embodiment of FIG. 1.

The speaker 29 may comprise any of the conventional speakers, per se, or as an integral part of a unit. For example, as illustrated in FIG. 3, the speaker 29 may be a built-in speaker in the small cassette record player 33.

Ordinarily, it is preferable to employ economical speakers; although it is desirable that the speakers have relatively good fidelity for giving the instructions plainly and audibly.

The instruction play means 31 will be appropriate to the recorded instruction means. As illustrated, the instruction play means will comprises a read head and an amplifier 35, FIG. 3. The speaker 29 is labeled SPKR and the amplifier 35 is labeled AMPL in FIG. 3. The cassette record players 33 are readily available commercially, as indicated hereinbefore.

The switch 21, as indicated hereinbefore, simply energizes the instruction play means, or turns on the cassette record player 33, responsive to movement of the support 15. Typically a hanger switch can be employed such that when the fire extinguisher is lifted and pulled from the support 15, the support 15 may be spring loaded upwardly to turn on the switch 21.

In operation, the specific cassette and instructions regarding the particular fire extinguisher at the particular location are recorded onto the recorded instruction means 23; as by moving the cassette record player into the record mode and speaking into a microphone connected therewith. Thus the instructions are recorded in clearly enunciated language onto the recorded instruction means 23. The recorded instruction means 23 is rewound such that it is ready to play when the instruction play means 31 is energized, as by turning on the switch 21. The fire extinguisher is properly charged with suitable seals in place as appropriate and hung on the support 15.

When the fire extinguisher is ready to be employed, the person 19 lifts it from the support 15, turning on switch 21. The instruction play means 31 is energized, as by turning on the amplifier in the cassette record player 33. As a consequence, the recorded instruction means on the tape in the cassette 27 are moved past the read head and the signal converted to an audible set of instructions warning the person 19 as to the precautions to be taken with respect to the kind of fire on which the fire extinguisher is to be used and the manner of using the fire extinguisher.

OTHER EMBODIMENTS

There are many other embodiments of this invention that may be widely useful. For example, the ordinary type of emergencies that a mother is likely to encounter with her children may be recorded on a plurality of individually selectable recorded instruction means and a selector employed so that the mother can dial in, or select, a particular type of emergency; such as, heart attack, drowning, choking, a bean in the nostril, a bite by a poisonous snake or spider, or the like, a bad cut on an artery or a vein, or a broken bone. The mother can simply dial in the selector, flip on the switch and receive the instructions audibly.

This approach to emergency is also widely useful in the medical profession where a doctor may be practicing ordinarily in one speciality but not in others. A specific embodiment that has been of interest is that of a dentist that may have an allergic reaction by a patient in the dentist chair. It is in this environment that the following embodiment will be described to illustrate the principle of these types of embodiments of this invention.

There are provided multiple audible instruction means for instructing a participant in the emergency in handling the respected predetermined and preselected emergency; activator means for activating a selected instruction means to give audible instructions to the participant so as to allow the participant to use both hands and eyes in treating the emergency; a selector for selecting a particular emergency from among the predetermined and preselected plurality of emergency instruction means; and a switch for turning on the combination, or apparatus, 11.

Referring to FIGS. 4 and 5, the apparatus includes the switch 21, selector 41, the instruction play means 43, the recorded instruction means 45 and the speaker 29.

The switch 21 and the speaker 29 have been described hereinbefore with respect to the embodiment of FIGS. 1–3 and need not be described again in this context since they serve the same purpose. In the embodiment of FIGS. 4 and 5, a dentist may be working on a patient 51 in a dentist chair 53, as by giving him laughing gas or other type of anthesia and a patient may have an allergic reaction to create a medical emergency; for example, heart attack, suddenly stop breathing, or other emergencies that are not ordinary occurrences. The dentist then operates the selector 41 to the desired emergency and proceeds to revive the patient while the instructions are played to him. The instruction may give such information as the type and quantity of stimulant to be given, type of follow through, and the like. As illustrated in FIGS. 5 and 6, the switch 49 is connected with the selector 41. It may be also connected, shown by the conductor 57 with the instruction playing 43, directly or by way of the selector 41. As can be seen in FIG. 6, the selector 41 is, in effect, a double pole, double throw switch to energize a particular recorded instruction means 43A and connect the output therefrom to the speaker 29. As illustrated in FIG. 6, there are a plurality of recorded instruction means 43*a–d* that are energized respectively when the selector is turned to them. They, accordingly, play the particular cassette or recorded instruction means 45*a–d*. Thus in the illustrated embodiment, the dentist will have prerecorded instructions for eventualities that he deems most likely to befall him in his emergencies in the office such that he can respond to the emergencies simply by flicking the switch or toggle, 49; and, thereafter, have both hands and eyes free to perform the corrective actions.

In the embodiments described hereinbefore, the use of a cassette type record player has been described since it is relatively easy to get good fidelity from such an instrument without great costs. While the medical community is willing to pay for quality instruments and can afford such a system, it is readily apparent that such a system is not going to be accepted readily by the ordinary housewife, or homeowner. Accordingly, more economical embodiments will be employed in the home market. For example, the toy motor marketed by Mattel can be employed. In that the toy, it will be recalled, the different sounds of animals such as the cow mooing, or the pig squealing were recorded on the record and the selector lever moved a needle to a particualr portion of the record such that when a string was pulled a spring motor caused the record to rotate and emit the sounds recorded on the record. When this approach is adapted to this invention, the instructions for the poisonous bite, the burn, the bad cut, or the like are recorded onto the record. The selector moves the needle to the particular set of instructions. The record is then advanced responsive to a spring motor serving as the instruction play means 43 and the audible instructions are emitted through the speaker in the unit. While the fidelity of this unit is not as high as desired.in the medical field, it is acceptable.

This invention is being perfected by the use of semiconductor chips with record units such as floppy discs or other semi-conductor means for storing bits of information, such as sound or syllables of words or the like. In this embodiment, the selector comprises a plurality of squelch units such diodes, field effect transistor units or the like that can be employed to squelch a plurality of conduction channels while opening up, or rendering conductive another specific channel, as by suitable biasing. On that channel the instruction play means will convert the recorded instruction means 45 into suitable electronic signals that are sent to the speaker 29 to afford audio instructions.

A wide variety of other approaches can be employed. Instead of the record and needle, or the tape on a cassette and a read head, there are various other types of records and read, or play, means that could be employed. For example, wire such as was employed in the earlier voice recorders can be employed. A magnetic card system could be employed to play a selected card; or a juke box type selection unit could be employed to play back a selected instruction record.

A variety of sources power can be employed depending on the location. Ordinarily, it would be desirable to employ electrical power. The electrical power can be from a conventional electrical system in a building, a battery or the like. On the other hand, the power can be a pull string that winds up a spring motor. A pure spring motor can be employed that is turned on by a mechanical switch, after being manually wound such that it needs only be released.

As indicated hereinbefore, the actual actuation would depend upon the environment and the costs the user is willing to pay. These may range from a simple pull string for pulling a spring motor or the like through a variety of trigger mechanisms alone or with use of a dial actuator. If desired, certain tone buttons in combination with frequency responsive relays, such as used in the pushbutton telephones can be employed. If desired, manual sliders or buttons could be employed.

While the releasing of a switch upon the picking up of a fire extinguisher has been described hereinbefore, if desired, the safety seal around the neck can operate to pull a string; breaking the seal could release a switch, or other such interplay could be employed as desired.

From the foregoing, it can be seen that this invention accomplishes the objects delineated hereinbefore and obvious the deficiences of the prior art.

While the invention has been described with a certain degree of particularity, it is to be understood that the present disclose is made only by way of example and that numerous changes in the details of construction and the combination and arrangement of parts may be resorted to without departing from the spirit in scope of this invention, reference being had to the claims for the latter purpose.

What is claimed is:

1. An improved safety combination adapted to facilitate fighting a fire by an operator, comprising:

a. a fire extinguisher at a fire extinguisher station;

b. support supporting said fire extinguisher at said fire extinguisher station such that said fire extinguisher can be removed from said support by the operator;

c. a speaker adapted to emit audible verbal signals that are perceptible by the operator operating said fire extinguisher; said speaker being disposed at said first station;

d. recorded instructions recorded in a first form and transduceable into audible verbal signals by an instruction play means and said speakers;

e. instruction play means for transducing said instructions from said first form into a form that, in combination with said speaker will convert said first form into audible verbal signals for said operator; said instruction play means being connected with said recorded instructions and with said speaker; and f. switch means for energizing said instruction play means when said fire extinguisher is lifted from said support; said switch means being connected with said instruction play means and responsive to said fire extinguisher on said support;

such that audible verbal signals are supplied to the operator operating said fire extinguisher to give instructions and simultaneously allow full free use of the operators hands for fighting a fire.

2. The combination of claim 1 wherein said instructions that are recorded and finally produce said audible verbal signals instruct said operator as to the type of fire on which said fire extinguisher is to be used and as to which it must not be used, and as to the proper use of the fire extinguisher to fight said fire.

3. The combination of claim 1 wherein said speaker emits said audible verbal signals responsive to electrical signals; said instruction play means transduces said first form of said recorded instruction into electrical signals for said speaker to emit said audible verbal signals.

4. The system of claim 3 wherein said recorded instructions comprises tape in a cassette; said instruction play means comprises a cassette recorder for playing said cassette and converting the signals on said cassette tape to electrical signals for said speaker.

* * * * *